Dec. 6, 1966     W. M. POSCHMAN II     3,290,457
ELECTRIC DISTRIBUTION BOX WITH CIRCUIT BREAKER AND TIMER
Filed Oct. 21, 1963
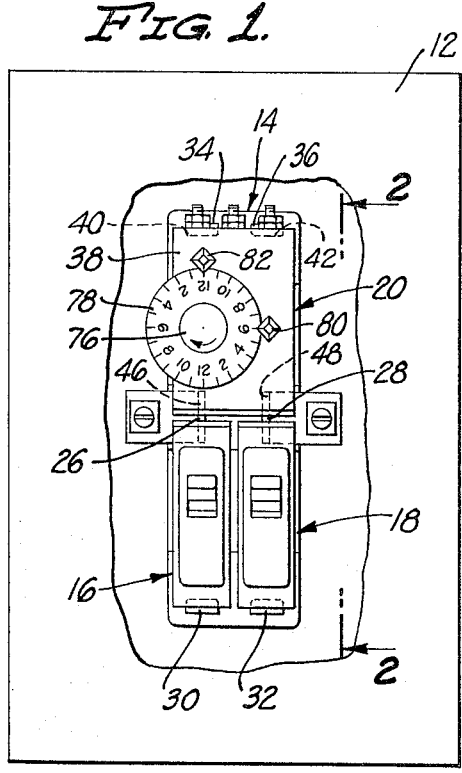
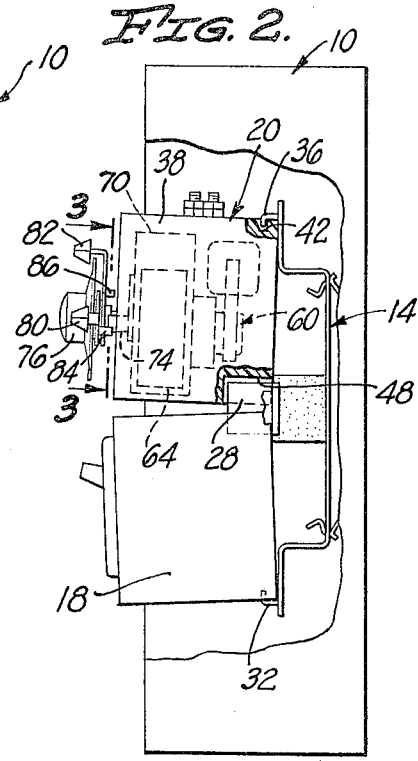
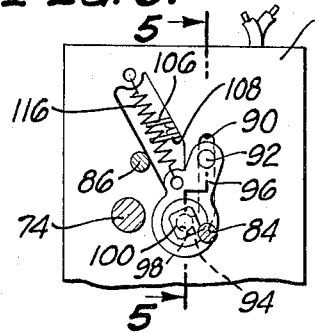
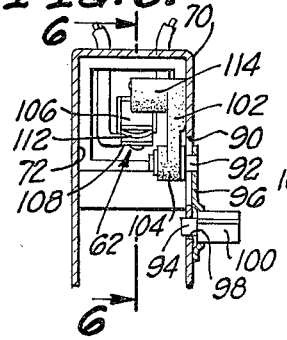
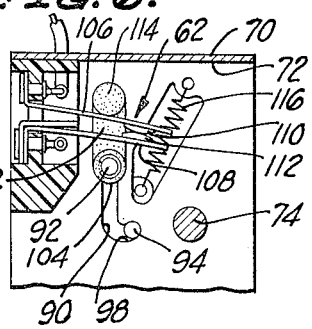
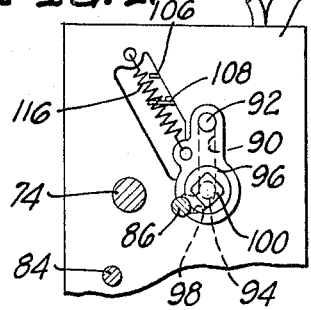
INVENTOR.
WILLIAM M. POSCHMAN II
BY HIS ATTORNEYS
HARRIS, KIECH, RUSSELL & KERN United States Patent Office
3,290,457
Patented Dec. 6, 1966

3,290,457
ELECTRIC DISTRIBUTION BOX WITH CIRCUIT
BREAKER AND TIMER
William M. Poschman II, 2133 Industrial Road,
Las Vegas, Nev.
Filed Oct. 21, 1963, Ser. No. 317,625
3 Claims. (Cl. 200—38)

The present invention relates in general to apparatus for opening and closing electric circuits at predetermined times and, more particularly, to a timer installable in an electric distribution box and adapted to close and open an external electrical circuit supplied from the distribution box. The present invention is an improvement on that in my U.S. Patent No. 3,026,384.

Such a distribution-box timer installation may be used for a variety of purposes. Merely by way of example, it may be used to turn lights in a residence on and off periodically during the absence of the occupant to discourage burglarly, it may be used to activate a lawn sprinkling system, or the like.

The present invention contemplates utilizing a self-contained timer comprising a timer housing, an electric timer motor in the timer housing, and means operated by the timer motor for opening and closing an external circuit at predetermined times. In the prefered embodiment of the invention, the latter means comprises a timer switch located in the timer housing and connectible in series in the external circuit to be controlled.

The invention further contemplates utilizing such a self-contained timer in an electric distribution box provided therein with at least two circuit-breaker holding or mounting means, and provided therein with a circuit breaker having a circuit breaker housing engaged with one of the holding or mounting means, such circuit breaker also having a circuit breaker switch connected in series in the external circuit to be controlled by the timer.

A primary object of the present invention is to provide a self-contained timer wherein the timer housing is separate from the circuit breaker housing and is provided with engagement means complementary to and engageable with any of the circuit-breaker holding or mounting means in the distribution box. With this construction, the circuit breaker associated with the external circuit to be controlled may be mounted on one of the circuit-breaker holding or mounting means, and the timer for opening and closing the controlled circuit may be mounted on another of the circuit-breaker holding or mounting means and suitably connected to the controlled circuit in controlling relation thereto, as by connecting the timer switch in the controlled circuit in series with the circuit breaker switch. This results in a very simple way of providing timed control of an external circuit leading from a circuit breaker since the timer is mounted and held in the distribution box in the same manner as the associated circuit breaker, which is an important feature of the invention.

It will be understood that the timer may be designed for connection to the external circuit to be controlled by means of external connections, or it may be designed for automatic connection to the controlled circuit upon engagement with the corresponding circuit-breaker holding or mounting means. In either event, it is an object of the invention to connect the timer motor in series with the switch of the associated circuit breaker so as to deenergize the timer motor in the event of an overload sufficient to trip such circuit breaker.

Another object of the invention is to provide a timer provided with a separate switch chamber in the timer housing, the timer motor being located in the timer housing externally of the switch chamber and the timer switch being located in the switch chamber and including switch contacts relatively movable into and out of engagement by an actuating mechanism interconnecting the timer motor and the timer switch. With this construction, the switch contacts are isolated from the remaining electrical components of the timer so as to protect same from damage due to arcing between the switch contacts as they are opened or closed. In this connection, an object is to provide switch contacts which engage and disengage with a sliding motion to minimize arcing.

A general object of the invention is to provide a timer having a timer switch capable of handling heavy currents, e.g., of the order of one hundred amperes, or more, as protection against damage from overloads.

The foregoing objects, advantages, features and results of the invention, together with various other objects, advantages, features and results thereof which will be evident to those skilled in this art in the light of the present disclosure, may be achieved with the exemplary embodiment of the invention described in detail hereinafter and illustrated in the accompanying drawing, in which:

FIG. 1 is a front elevational view of an electric distribution box in which the present invention has been installed, a portion of the cover of the distribution box having been broken away to reveal the contents thereof;

FIG. 2 is a side elevational view, partially in section, taken along the arrowed line 2—2 of FIG. 1, a part of one side of the distribution box having been broken away to reveal the contents thereof and the cover of the distribution box having been removed;

FIGS. 3 and 4 are enlarged, fragmentary sectional views both taken as indicated by the arrowed line 3—3 of FIG. 2 and respectively showing various parts in different operating positions;

FIG. 5 is a sectional view taken along the arrowed line 5—5 of FIG. 3;

FIG. 6 is a sectional view taken along the arrowed line 6—6 of FIG. 5; and

FIG. 7 is a schematic wiring diagram.

Referring initially to FIGS. 1 and 2 of the drawing, illustrated therein is a conventional electric distribution box 10 having a removable cover 12. Suitably mounted in the distribution box 10 is a conventional circuit-breaker supporting structure 14. In the particular construction illustrated, the supporting structure 14 is capable of carrying four conventional circuit breakers. In the present instance, however, the supporting structure 14 is shown as carrying only two circuit breakers 16 and 18, and is shown as carrying a self-contained timer 20 of the invention in lieu of two additional circuit breakers. The timer 20 may be electrically associated with one or both of the circuit breakers 16 and 18, and is described in detail hereinafter as electrically associated with the circuit breaker 18 only for convenience. While only two circuit breakers 16 and 18 and one timer 20 of the invention are shown, it will be understood that these numbers may be varied. For example, with a distribution box, not shown, capable of receiving more than four circuit breakers, two or more of the timers of the invention, each controlling one or more external circuits, may be used.

Considering the supporting structure 14 in more detail, it carries central electrical buses 26 and 28 in spaced relation. As is conventional, the housings of the circuit breakers 16 and 18 carry bus clips, not shown, adapted to telescope over and frictionally engage the buses 26 and 28, respectively. It will be noted from FIGS. 1 and 2 that only a portion of each bus 26 and 28 adjacent one edge thereof is thus engaged.

The buses 26 and 28 form parts of circuit-breaker holding or mounting means for the respective circuit breakers 16 and 18. The remaining parts of the circuit-breaker holding or mounting means for the circuit breakers 16 and 18 are formed by hook-like clips 30 and 32 facing the buses 26 and 28 and respectively insertable into complementary recesses in the sides of the circuit breaker housings opposite the sides thereof which carry the bus clips for engagement with the buses 26 and 28. Thus, the buses 26 and 28 and the clips 30 and 32 form circuit-breaker holding or mounting means for the circuit breakers 16 and 18, the corresponding parts of the circuit breakers themselves forming engagement means engageable with such holding or mounting means. As will be clear from FIGS. 1 and 2, the clips 30 and 32 are carried by the supporting structure 14 on one side of the buses 26 and 28. The supporting structure 14 is provided, on the opposite side of the buses 26 and 28, with similar hook-like clips 34 and 36 facing the respective buses. The timer 20 includes a housing 38 of electrical insulating material provided in one side thereof with recesses 40 and 42 respectively complementary to and adapted to receive therein the hook-like clips 34 and 36. The timer housing 38 is provided on its opposite side with notches 46 and 48 respectively complementary to and respectively having side walls adapted to telescope over and frictionally engage those portions of the buses 26 and 28 which are not engaged by the bus clips carried by the housings of the circuit breakers 16 and 18. It should be noted that the timer housing has the configuration of the breaker housings and that the timer of the invention can be made to fit into any of the presently known multibreaker housings.

As will be apparent, the circuit breakers 16 and 18 are installed by first engaging them with the clips 30 and 32, and by then pressing the bus clips thereof onto the respective buses 26 and 28. The timer 20 is installed in essentially the same manner. In other words, the recesses 40 and 42 are first engaged with the clips 34 and 36, and then the notches 46 and 48 are engaged with the buses 26 and 28 by pressing the timer housing 38 inwardly over the buses. Thus, the buses 26 and 28 and the clips 34 and 36 form a circuit-breaker holding or mounting means used, in accordance with the invention, to hold or mount the timer 20. Correspondingly, the recesses 40 and 42 and the notches 46 and 48 in the timer housing 38 constitute an engagement means on the timer housing engageable with the holding or mounting means formed by the clips 34 and 36 and the buses 26 and 28. This construction provides a very simple means of mounting the timer 20 in the distribution box 10, utilizing unused circuit-breaker holding or mounting means. It will be understood that in any normal installation, there will always be such unused circuit-breaker holding or mounting means available for the timer 20.

The timer 20 may be utilized to control one or more of the external circuits supplied from the distribution box 10. For convenience, the timer 20 will be considered herein as controlling only an external circuit controlled by one of the circuit breakers 16 and 18, e.g., the circuit breaker 18.

Referring to FIG. 7 of the drawings, the circuit breakers 16 and 18 are shown as including circuit breaker switches 52 and 54 in series with the respective buses 26 and 28. The circuit breaker switch 54 is shown as connected in series in an external controlled circuit 56 having a connection to a return bus 58 in the distribution box 10. The timer 20 may open and close the controlled circuit 56 in various ways.

In accordance with the preferred embodiment of the invention, the timer 20 includes a timer motor 60 which opens and closes a timer switch 62 through an intervening clock mechanism 64, suggested in broken lines in FIG. 2. Referring again to FIG. 7, the timer motor 60 is shown as connected in series with the circuit breaker switch 54 and in parallel with the controlled circuit 56. With this construction, in the event of an overload sufficient to trip the circuit breaker 18, the timer 20 is de-energized. The timer switch 62 is connected in series with the circuit breaker switch 54 and the controlled circuit 56. Thus, whenever the timer switch 62 is closed or opened by the timer motor 60 and the intervening clock mechanism 64, the controlled circuit 56 is correspondingly energized or de-energized, the former assuming that the circuit breaker switch 54 remains closed. Thus, any electric lights, devices, appliances, or the like, in the controlled circuit 56 are energized and de-energized at predetermined times under the regulation of the timer 20. In an alternative arrangement the timer can be connected in the circuit between the power source and a bus of the distribution box to control power to a plurality of breakers and load circuits.

Considering a preferred construction for the timer 20, the timer housing 38 includes a separate subhousing 70 which forms a compartment 72 for the timer switch 62 (the clock mechanism 64 incidentally being disposed in the subhousing 70). The timer motor 60 is disposed within the timer housing 38 externally of the subhousing 70, and thus outside the switch compartment 72. This is an important feature since it prevents any arcing which may occur as the timer switch 62 opens and closes from damaging other electrical components of the timer, such as the timer motor 60 and its connections.

Considering the preferred construction of the timer 20 in somewhat more detail, the timer motor 60, through the clock mechanism 64, drives a shaft 74 carrying a control knob 76 having a 24-hour clock face 78. Circumferentially adjustable relative to the control knob 76, and frictionally driven thereby, are "on" and "off" pointers 80 and 82 respectively corresponding to closing and opening of the timer switch 62 and respectively having connected thereto "on" and "off" actuating cams 84 and 86 respectively located different radial distances from the axis of the shaft 74.

One wall of the subhousing 70 is provided adjacent the circumferential paths of the actuating cams 84 and 86 with a J-shaped slot 90, FIGS. 3 and 4, which receives guide pins 92 and 94 on a control member 96, the guide pin 94 being movable generally radially, relative to the axis of the shaft 74, into and out of a hooked portion 98 of the J-slot 90, as will be clear from FIGS. 3 and 4. Such generally radial movements of the guide pin 94 into and out of the hooked portion 98 of the J-slot 90 are respectively produced by engagement of the "on" and "off" actuating cams 84 and 86 with opposite sides of a cam follower 100 projecting axially outwardly from the control member 96 into the circumferential paths of the actuating cams. As will be clear from FIG. 3, the "on" actuating cam 84 is engageable with the outer side of the cam follower 100 to displace the guide pin 94 radially inwardly into the hooked portion 98 of the J-slot 90. The off actuating cam 86 is engageable with the inner side of the cam follower 100 to produce radially outward movement of the guide pin 94, as will be clear from FIG. 4.

The foregoing radially inward and outward movements of the guide pin 94 under the influence of the "on" and "off" actuating cams 84 and 86 produce longitudinal movement of the guide pin 92 in the straight section of the J-slot 90, and corresponding over-all movement of the control member 96, as will be clear from a comparison of FIGS. 3 and 4. This over-all movement of the control member 96 is imparted to a switch actuating member 102 of electrical insulating material having an end 104 connected to the control member 96 by virtue of being connected to the guide pin 92. The timer switch 62, as best shown in FIG. 6, includes two cantilevered leaf springs 106 and 108 respectively carrying switch contacts 110 and 112 constituting the timer switch. In the open position of the timer switch 62, the contacts 110 and 112 are held apart by the inherent resilience of the leaf springs 106 and 108 carrying them. In order to close the timer switch 62 in response to engagement of the cam follower 100 by the "on" actuating cam 84, the switch actuating member 102 is provided with a lug 114, at its opposite end from the end 104 connected to the guide pin 92, which is engageable with the leaf spring 106. As shown in FIG. 6, when the cam follower 100 is engaged by the "on" actuating cam 84 to move the guide pin 94 radially inwardly and to correspondingly displace the control member 96, the switch actuating member 102 biases the leaf spring 106 toward the leaf spring 108 to bring the contact 110 into engagement with the contact 112, thereby closing the timer switch 62. When the "off" actuating cam 86 subsequently engages the cam follower 100, a tension spring 116, connected at one end to the control member 96 and at its other end to the subhousing 70, displaces the control member into the position shown in FIG. 4 of the drawing. When this occurs, the switch actuating member 102 is displaced into a position permitting separation of the leaf springs 106 and 108, and consequent separation of the contacts 110 and 112, to effect opening of the timer switch 62.

It will be noted that the leaf springs 106 and 108 are generally parallel. Consequently, as the leaf spring 106 is displaced toward the leaf spring 108 to bring the contact 110 into engagement with the contact 112, the leaf spring 108 yields to provide sliding interengagement of the contacts 110 and 112. Similar sliding movement occurs upon opening of the timer switch 62. Such relative sliding movement of the contacts 110 and 112 in closing and opening the timer switch 62 minimizes arcing, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a timer, the combination of:
   (a) a housing;
   (b) a timer motor in said housing;
   (c) a timer switch in said housing;
   (d) a slot in said housing having two portions positioned at an angle to each other;
   (e) means for opening and closing said timer switch including an element movable in said slot between said portions thereof;
   (f) a first cam driven by said timer motor moving said element from one of said portions of said slot into the other closing said timer switch; and
   (g) a second cam driven by said timer motor moving said element from said other portion of said slot into said one portion thereof opening said timer switch.

2. In an apparatus for opening and closing an electric circuit, the combination of:
   (a) an electric distribution box;
   (b) two substantially identical circuit-breaker holding means in said box;
   (c) an overload protection circuit breaker having a circuit-breaker housing engaged with one of said holding means and adapted for engagement with either of said holding means;
   (d) said circuit breaker including a circuit-breaker switch adapted to be connected to said circuit in series therewith;
   (e) a timer having a timer housing separate and spaced apart from said circuit-breaker housing and engaged with the other of said holding means and adapted for engagement with either of said holding means, with said breaker and timer housings having corresponding means for engaging said holding means and being retained in said box in the same manner and with each of said housings separately and independently installable and removable from said box;
   (f) said timer including an electric motor;
   (g) means for energizing said motor; and
   (h) said timer including electric switch means within said timer housing connected in series with said circuit-breaker switch and operated by said motor for opening and closing said circuit at predetermined times.

3. An apparatus as defined in claim 2 in which said circuit-breaker holding means include an electrical bus and said housings include means for engaging said bus.

References Cited by the Examiner
UNITED STATES PATENTS

| | | | |
|---|---|---|---|
| 2,677,732 | 5/1954 | Miller | 307—141.8 |
| 2,717,339 | 9/1955 | Brown | 317—119 |
| 2,914,708 | 11/1959 | Edmunds | 317—119 |
| 3,206,384 | 3/1962 | Poschman | 200—38 |

BERNARD A. GILHEANY, *Primary Examiner.*

G. MAIER, *Assistant Examiner.*